United States Patent [19]

Carroll

[11] Patent Number: 4,887,400
[45] Date of Patent: Dec. 19, 1989

[54] GRANULAR MATERIAL STORAGE SYSTEM

[76] Inventor: Michael W. Carroll, 250 Lincoln Ave., Roselle, Ill. 60172

[21] Appl. No.: 205,121

[22] Filed: Jun. 10, 1988

[51] Int. Cl.$^4$ ............................................. E04H 7/22
[52] U.S. Cl. ..................................... 52/195; 414/293; 198/360; 406/136
[58] Field of Search ................... 52/192, 195, 63, 83, 52/195; 414/293, 294, 296, 299, 292, 306; 406/136–138, 151–153, 157, 159, 160

[56] References Cited

U.S. PATENT DOCUMENTS

| 446,436 | 2/1891 | Dodge | 198/360 |
|---|---|---|---|
| 501,771 | 7/1893 | Dodge | 414/293 |
| 3,727,656 | 4/1973 | Luders | 135/100 |
| 4,503,646 | 3/1985 | Lowe | 52/198 |

Primary Examiner—James L. Ridgill, Jr.
Attorney, Agent, or Firm—Fitch, Even, Tabin & Flannery

[57] ABSTRACT

A grain storage device is provided with an outer retaining wall which extends about a lower base. In the center of the retaining wall is a vertically-extending aeration tower which has a central, hollow interior through which air may be supplied for flow into grain which is piled in a generally conical pile beneath a vertically movable cover of flexible material which is raised and lifted along the tower as the pile beneath grows. To uniformly distribute the grain to have a symmetrically even pile, there is provided a distributor means on the tower which has the plurality of discharge ports which have valves for selectively controlling the size of the openings through the ports so as to control the amount of grain flowing about the tower and in different directions. Preferably, a deflecting means in the form of troughs are also used to deflect the streams at different angles so that to provide more uniform and symmetry for the pile being formed. The grain is delivered to the top of the distributor for falling downwardly between a filling skirt and the tower walls. The filling skirt prevents rain and other materials from entering into the aeration tower and prevent rain or other materials from entering into the grain during the filling operation. The filling skirt extends to the cover and is adjusted upwardly with the cover as the pile grows vertically along the aeration tower.

22 Claims, 9 Drawing Sheets

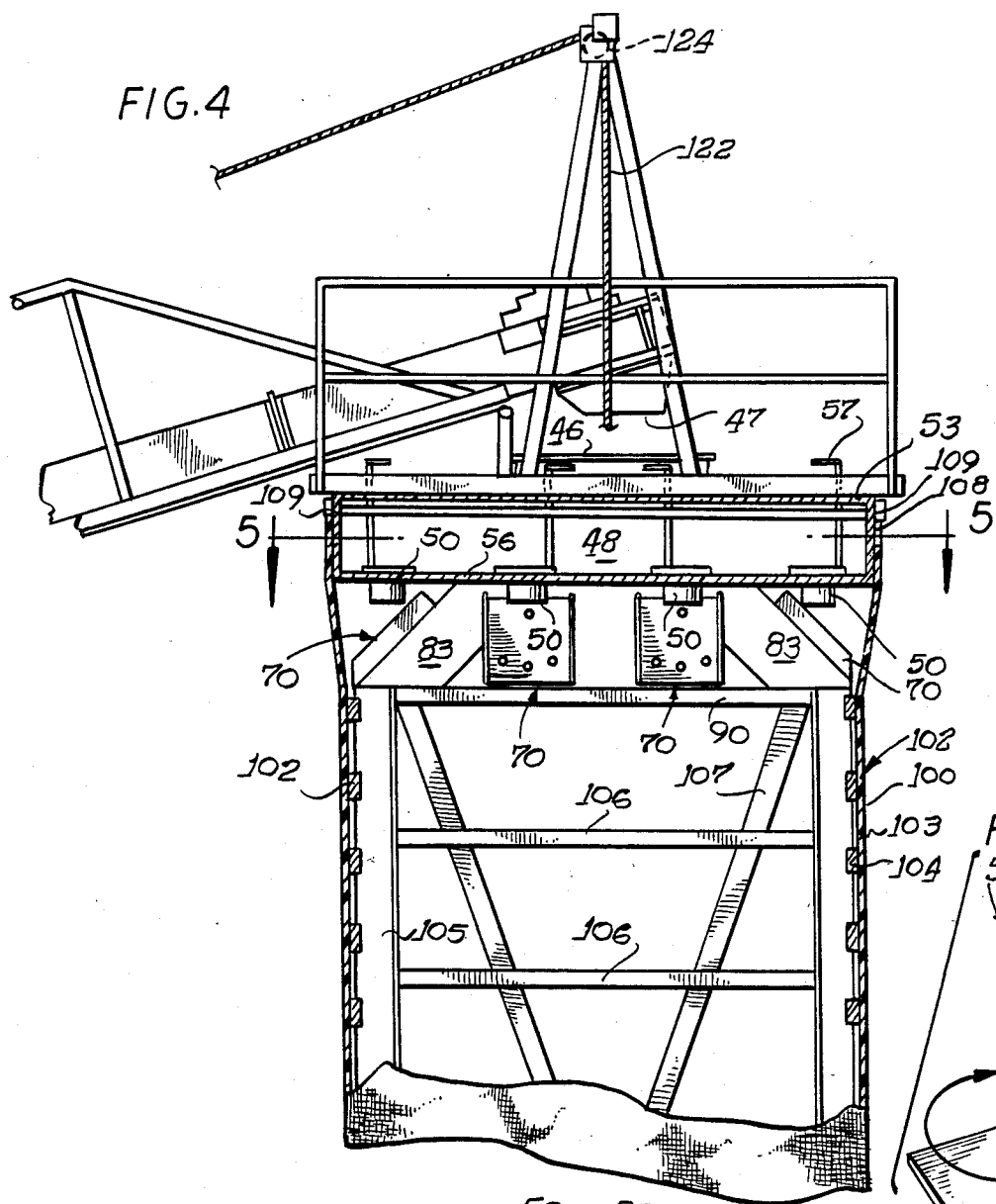
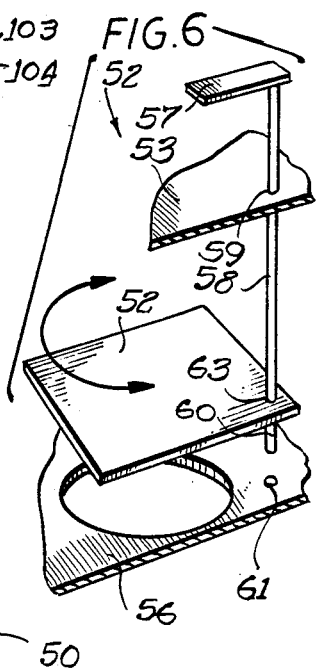
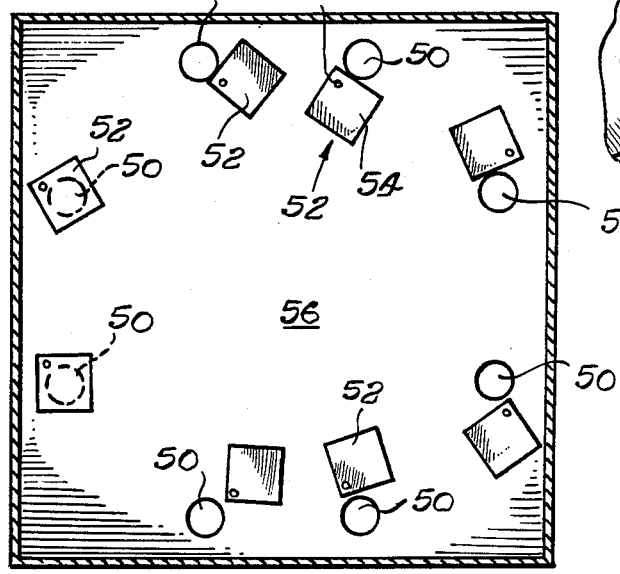

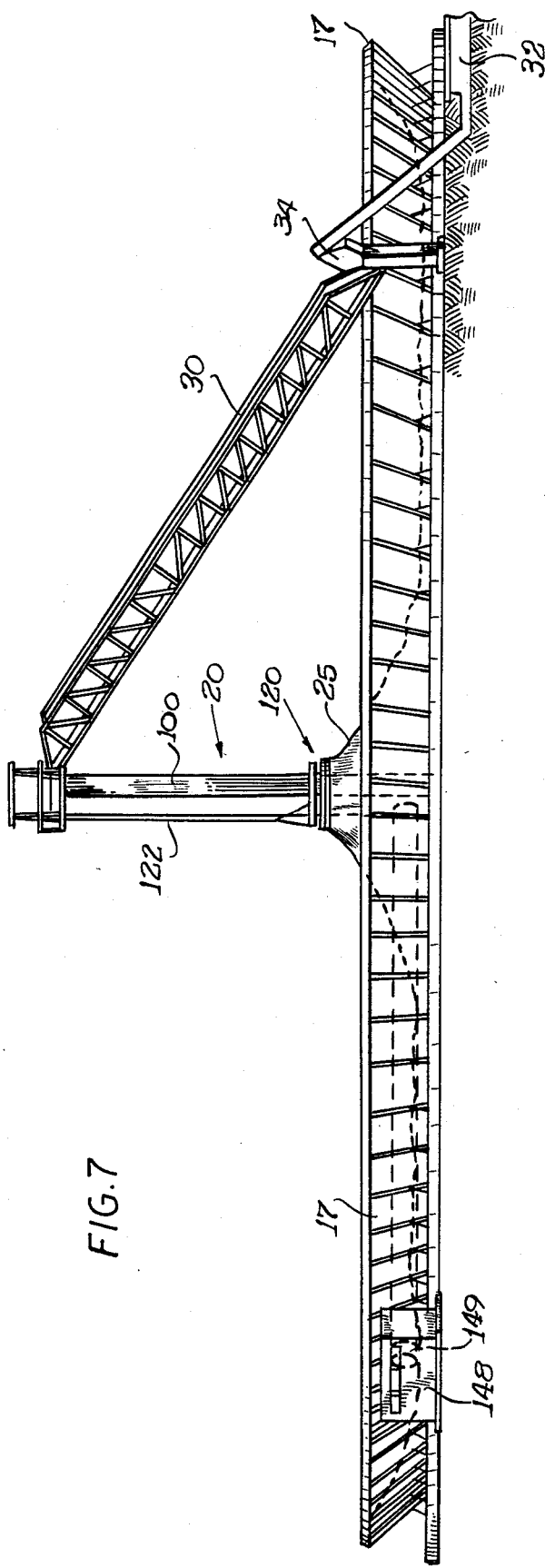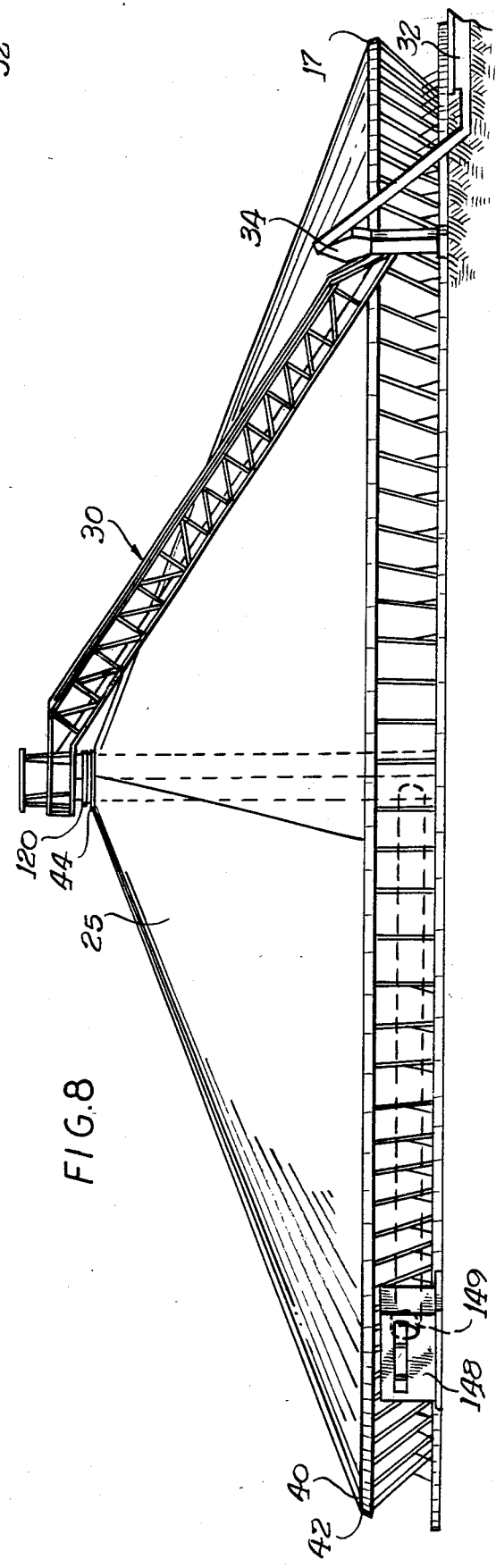
FIG.7
FIG.8

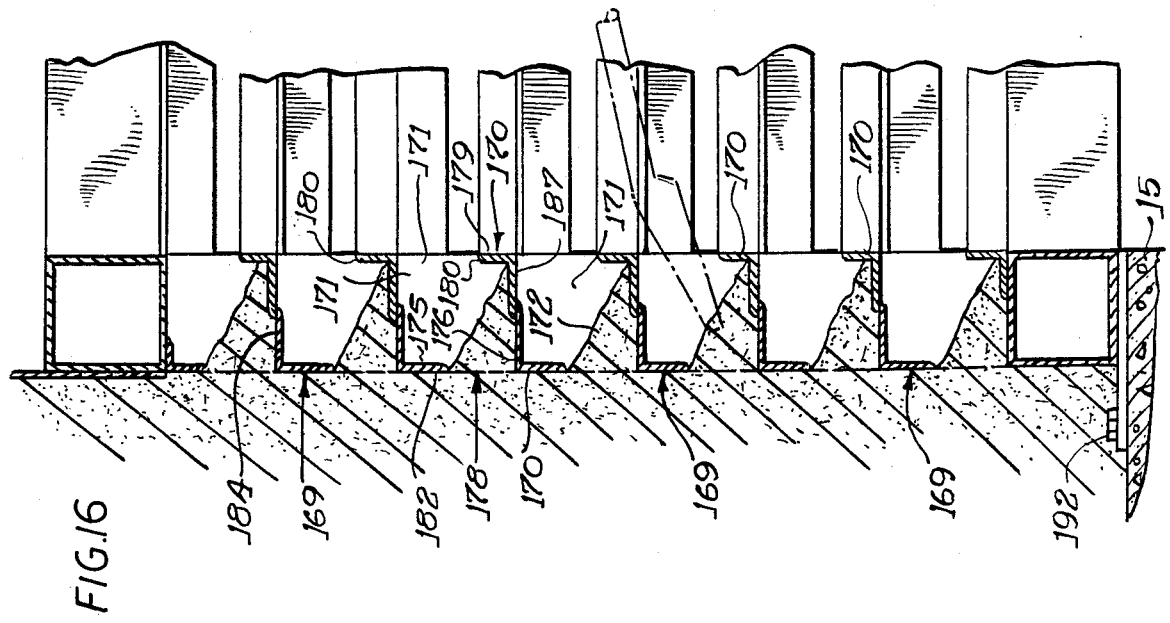
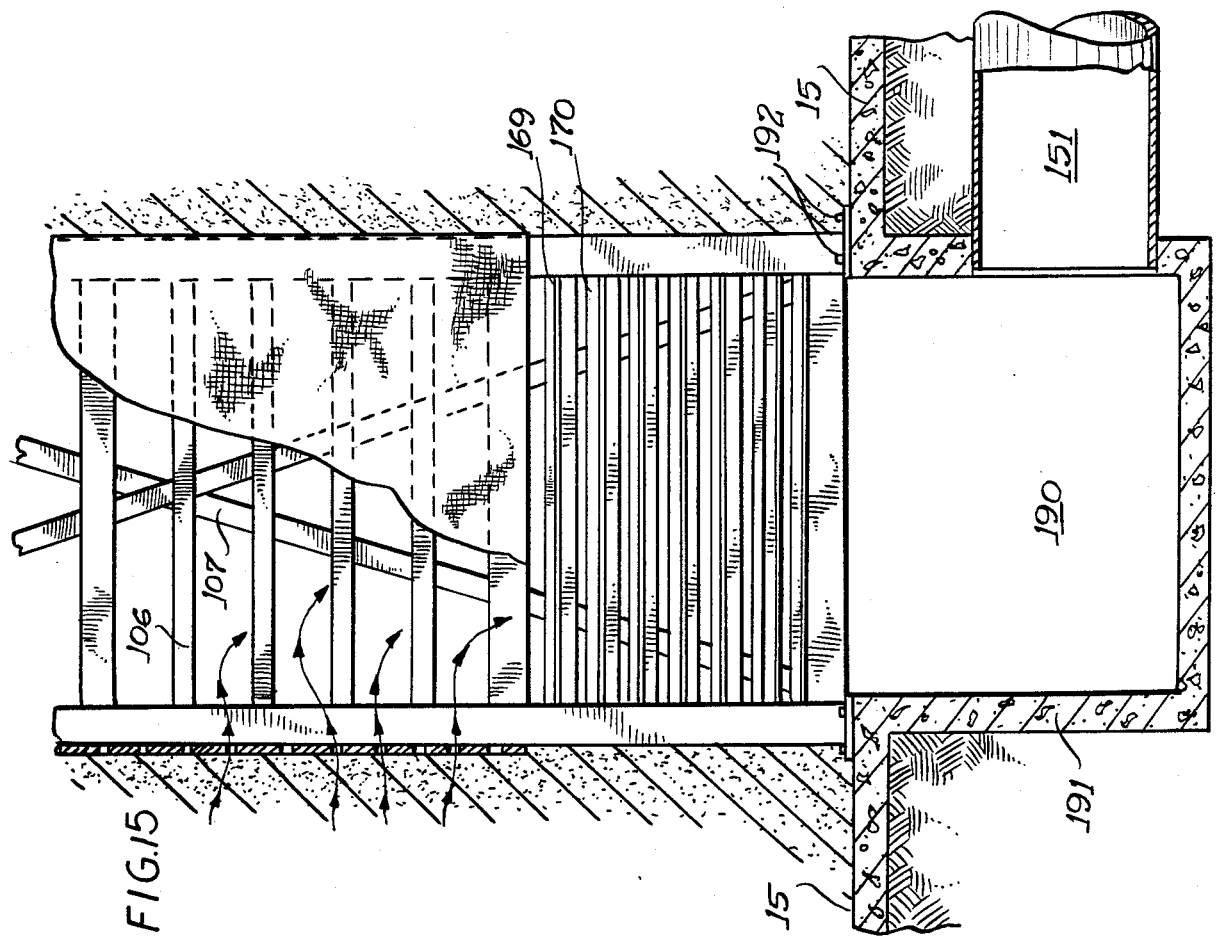

GRANULAR MATERIAL STORAGE SYSTEM

This invention relates to a storage system for a particulate material of flowable nature; such as grain, and more particular to grain storage systems in which the grain is stored in a generally conical pile beneath a flexible cover which rests on the top of the pile.

BACKGROUND OF INVENTION

For a number years now, grain has been deposited directly onto a suitable base, usually formed of blacktop or concrete, with the grain being piled in a very large conical pile with the grain being allowed to repose at its natural angle of repose. The grain is formed into such a conical pile by being dropped downwardly at a top central portion of the pile from a filling conveyor. The grain is dropped beneath a flexible cover laid on the pile. As the grain piles grows, the cover increasingly takes on its shape an is pulled upwardly at the center and takes on a more conically shape. After the pile has been completed, the central portion of the cover is secured to a central pole or tower and the lower peripheral edge is secured to a retaining like extending about the lower periphery of the conical pile. Typically, the retaining wall is an inclined wall which has air openings, which allow air to flow through the wall, the wall usually being five or six feet in height. The lower peripheral portion of the flexible cover, which is usually made of the vinyl or some canvass-like material is secured to the retaining wall. Various ways of aerating the corn or other grain which is in the pile is provided to assure that there is removable of moisture to aid in preventing spoilage.

A number of problems have been encountered when the formation of such grain piles using the flexible cover for the storage of the grain, one of which is to provide an even distribution of the granular material to keep the pile more conical. Typically, the system may include a central tower or pole with a filling conveyor extending from beyond the periphery of the retaining wall to the central tower. The filling conveyor may be a drag or screw conveyor, a gravity spout, or a portable vacuum or other various types of loading devices. Because of the large size of the grain storage which may be three hundred thousand to several million bushels of corn; for instance, the grain is often delivered to a dump pit, which is a drive-over type or a dump-hopper type from which the grain is removed and fed by the filling conveyor to the top of the pile. Because the covers are loose and the filling may take place over several days, there is often a danger of rain storms or wind storms which may loosen the cover or otherwise cause problems with rain water getting under the cover and wetting the grain.

It has been found that the discharge from the filling conveyor does not really provide a very uniform distribution of the granular material to form the conical shape. Often there was a requirement of a considerable amount of manual labor to try to move the grain to make it stack and fill evenly about the tower at the desired angle of repose as the grain at the center became higher and higher. The conveyor generally seems to want to provide more grain to one side or one area than to another side or area and even when the grain was attempted to be distributed more evenly, it was found that there were still minor areas in which the grain will not flow readily make a conical shape which is needed without further control of the grain flow.

The preferred embodiment of the grain storage system in uses an aeration tower which is a freestanding tower at the center of the pile to which the upper end of the filling conveyor is connected. The aeration tower serves, as its name indicates, to provide a suction tower for the pulling of air through the grain, preferably from the retaining wall and flows through the grain and into the central aeration tower for a flow downwardly to a main air duct, which is installed either on the surface or below grade and is connected to a centrifugal blower which discharges the air having been pulled through the grain mass so that there are no dead zones where the air is not being pulled through the grain. It would be preferred to use the aeration tower during the filling operation so that the grain is continuously and immediately aerated during the filling operation. Also, there is a need to hold the cover tight to the top surface of the grain pile during the filling operation so a wind storm doesn't remove it or damage the cover or let rain into the pile.

In addition to the foregoing, there is often a desire to know the condition of the grain particularly at the most inaccessible place, which is at the center bottom portion of the aeration tower. The condition of the grain at this area provides both buyer and seller with an idea of its quality.

Accordingly, a general object of the present invention is to provide a new and improved conical grain storage system having a flexible cover and an improved distributor for distributing the grain in a more even and directed way during the filling of the pile beneath the cover.

Another object of the invention is to provide a means for covering the aeration tower so it can be used during the filling operation to operate the grain and hold the cover down onto the top of the pile.

A further objection of the invention is to provide a lower portion of a aeration tower with means for extracting granular material from the center of the pile for an analysis thereof.

These and other objects and advantages of the invention will become apparent from the following detailed description taken in conjunction with the accompanied drawings in which:

FIG. 4 is a view showing the outer cover for the aerating tower and the distributor mounted thereon.

FIG. 5 is a sectional view taken along the line 55 of FIG. 4 showing valve and ports for the grain flow.

FIG. 6 is an enlarged exploded view of a preferred valve and grain port.

FIG. 7 illustrates the lifting of the cover and the associated fill skirt for the aeration tower.

FIG. 8 shows the cover for the grain being lifted to its fully upright position.

FIG. 15 is an enlarged section and cross-section showing the bottom portion of the aeration tower with means for sampling the grain.

FIG. 16 is a diagrammatic view taken inside the aeration tower with the sampling of the grain being undertaken.

Figure 1:
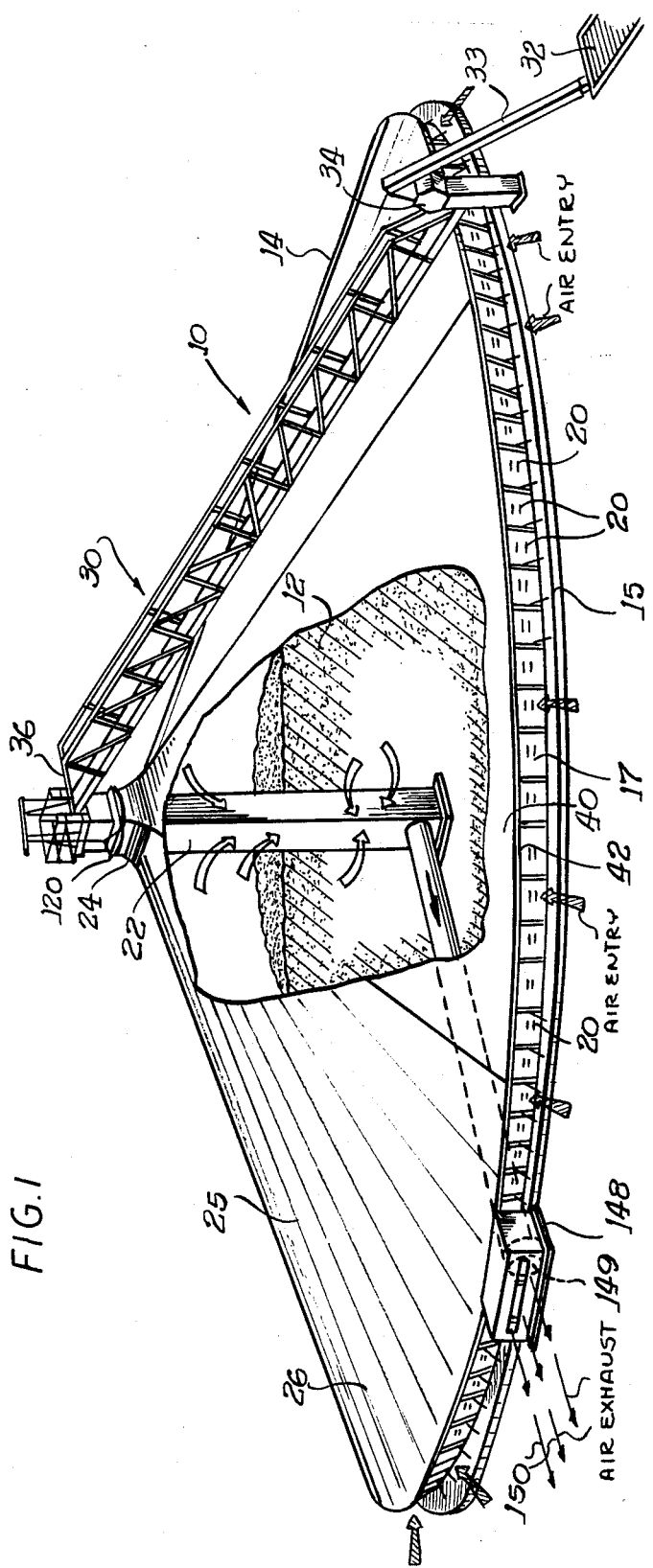
FIG. 1 is a perspective view of a grain storage system constructed in accordance with a preferred embodiment of the invention.

As shown in the drawings for purposes of illustration, the invention is embodied in a grain storage system 10 which includes a conical pile of granular material 12 which is stored at a natural angle of repose along an outer inclined wall 14 at an angle, usually about 22° to the horizontal. The grain is stored and rests on an underlying base 15 which is usually made of asphalt or concrete although the same could be unearthened base covered by an impervious plastic sheet. Upstanding from the base 15 on which rests the grain pile bottom is an annular retaining ring or wall 17, preferably in the form of an aeration wall which has specially design louvers or openings 20 in the wall which allow air to flow through the wall into the grain and through the grain to aerate the grain. The preferred retaining wall is reversely inclined under the edge of the pile so that snow or rain will not collect thereon and the openings 20 therein are protected to a certain extent from a straight, vertical dropping of rain or the like.

The typical manner of filling the pile is to fill from the center location at which is a tower or pole 22 which is used to support the top central portion 24 of the flexible, annular cover 25 which rests on the grain and has a generally conical shape formed of a plurality of individual, separate panels 26 connected together. Most grain storage systems of this type include a filling conveyor 30 which maybe of various types; such as a drag or screw conveyor, a gravity spout, tractor auger, portable vacuum or other type of conveyor. Usually, the grain is delivered to dump pit 32 or other device from which the grain is carried by a vacuum 33 to a grain cleaner 34 which discharges the cleaned grain onto the filling conveyor, which then carries the grain upwardly at an angle to discharge the grain at a conveyor discharge end 36 located at the top, center portion of the system. The grain discharges from the end 36 of the conveyor beneath the cover 25 so that the cover is always in position as the grain pile is being built. More specifically the cover is generally flat and is not in the conical shape initially. As shown in FIG. 7 the cover 25 may be in a very low generally flat condition at the initial filling and then only assumes its final conical shape as shown in FIG. 8 when the filling operation has been completed. Usually, during the filling operation, the lower peripheral edge 40 of the cover 25 is loose and is not connected to the retaining wall 17. It is only after the cover has achieved its final general shape as determined by the natural angle of repose of the filled grain pile that the lower peripheral edge of the cover 25 is connected to upper edge 42 of the retaining wall 17. The upper portion of the cover is also secured at 44 as shown in FIG. 8 to the top of the tower to provide a generally tight seal at the tower to prevent rain or snow or other material from flowing therebetween and into the grain.

A serious problem with the formation of the pile into a generally even geometrical shape having the same angle of repose all about the sides and along the top surface of the conical pile is that the grain does not want to flow evenly for 360° about the tower. It has been found that the distribution problem is particularly difficult because the grain does not seem what to flow easily to form a constant natural angle of repose completely about the 360° circumference about the aeration tower. Instead, there are many local areas and pockets which the grain does not fill and the condition worsens as the pile grows higher and higher. People with shovels try to even out the sides but this is a slow and expensive process.

In accordance with the present invention, there is provided a new and improved distributor means 45 which receives the discharge from the discharge end 47 of the filling conveyor and has an adjustable distributor means having a plurality of discharge ports 50 which distribute the grain from a receiving central chamber 48, as best seen in FIG. 4. In addition to the distributing of the grain more evenly from a series of ports 50; such as shown in FIG. 5, there is preferably arranged a series of valve means or control means 52 which are selectively adjustable to control the size of the orifice or opening through the port 50. The preferred valve means includes a pivotably mounted valve plate 54, which is pivotably mounted by a pivot pin 55 to a central bottom plate defining the floor 56 of the open chamber 48 in which the grain is being discharged from the one central end 47 of the filling conveyor. In this preferred and illustrated embodiment of the invention, there are provided eight ports 50 which are disposed in a generally circular array as shown in FIG. 5 to provide eight flowable discharges from the distributor about all of the different sides of the aeration tower. It has been found that when the grain discharges directly from the conveyor end 47 that there is not nearly as good as distribution circumferentially about the tower as when using the eight different ports with two different ports, 50 being provided for each of the sides of the tower.

Figure 2:
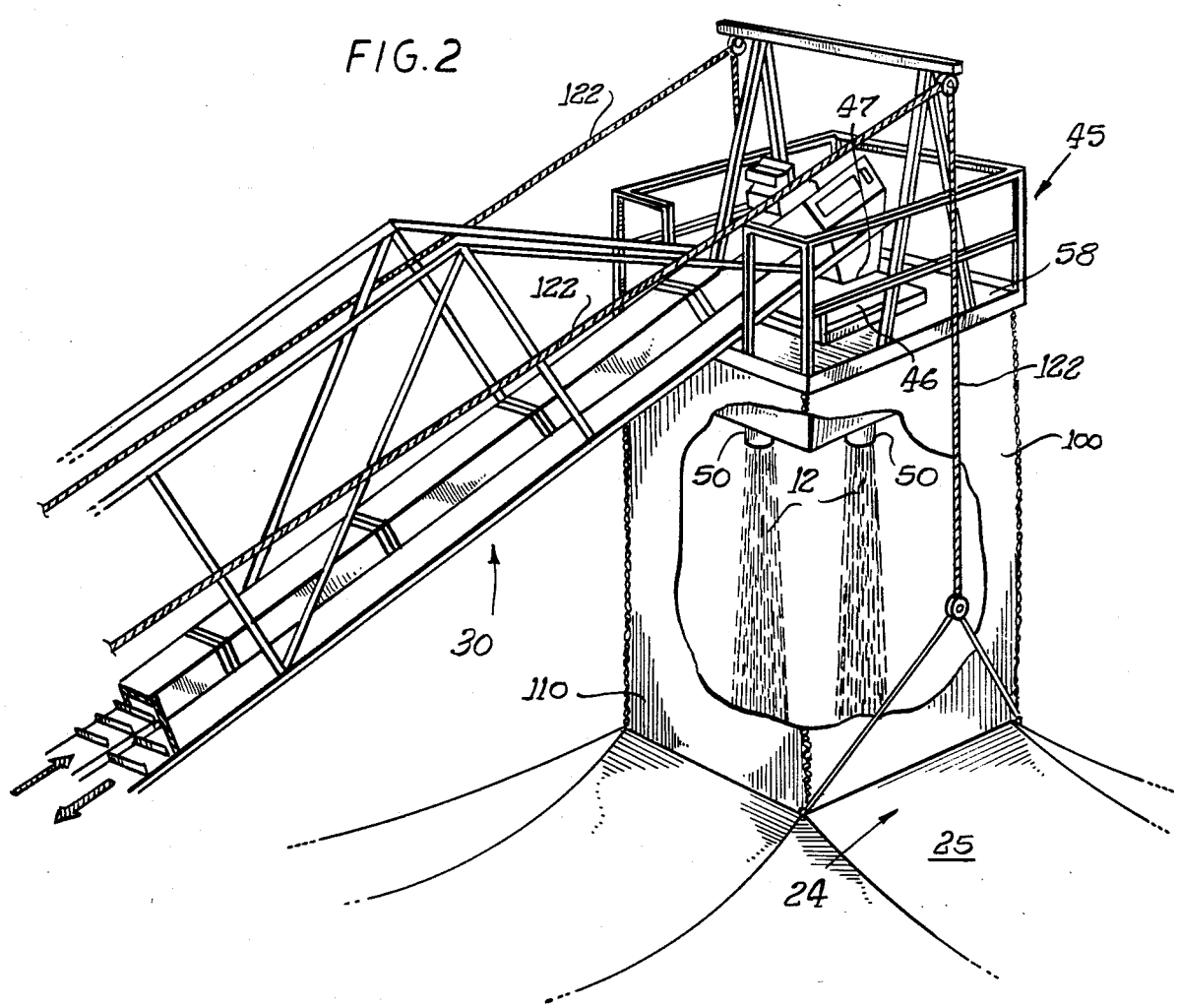
FIG. 2 is an enlarged view of the filling conveyor and of the distributor and a cover for the aeration tower with the grain cover being located below a fill skirt.
Figure 2A:
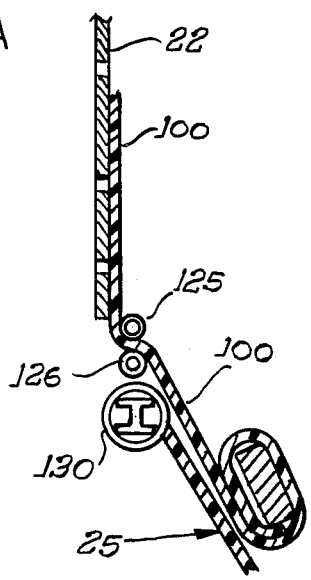
FIG. 2A is a partial cross-sectional view illustrating the juncture of the lifting ring, fill skirt and cover.
Figure 3:
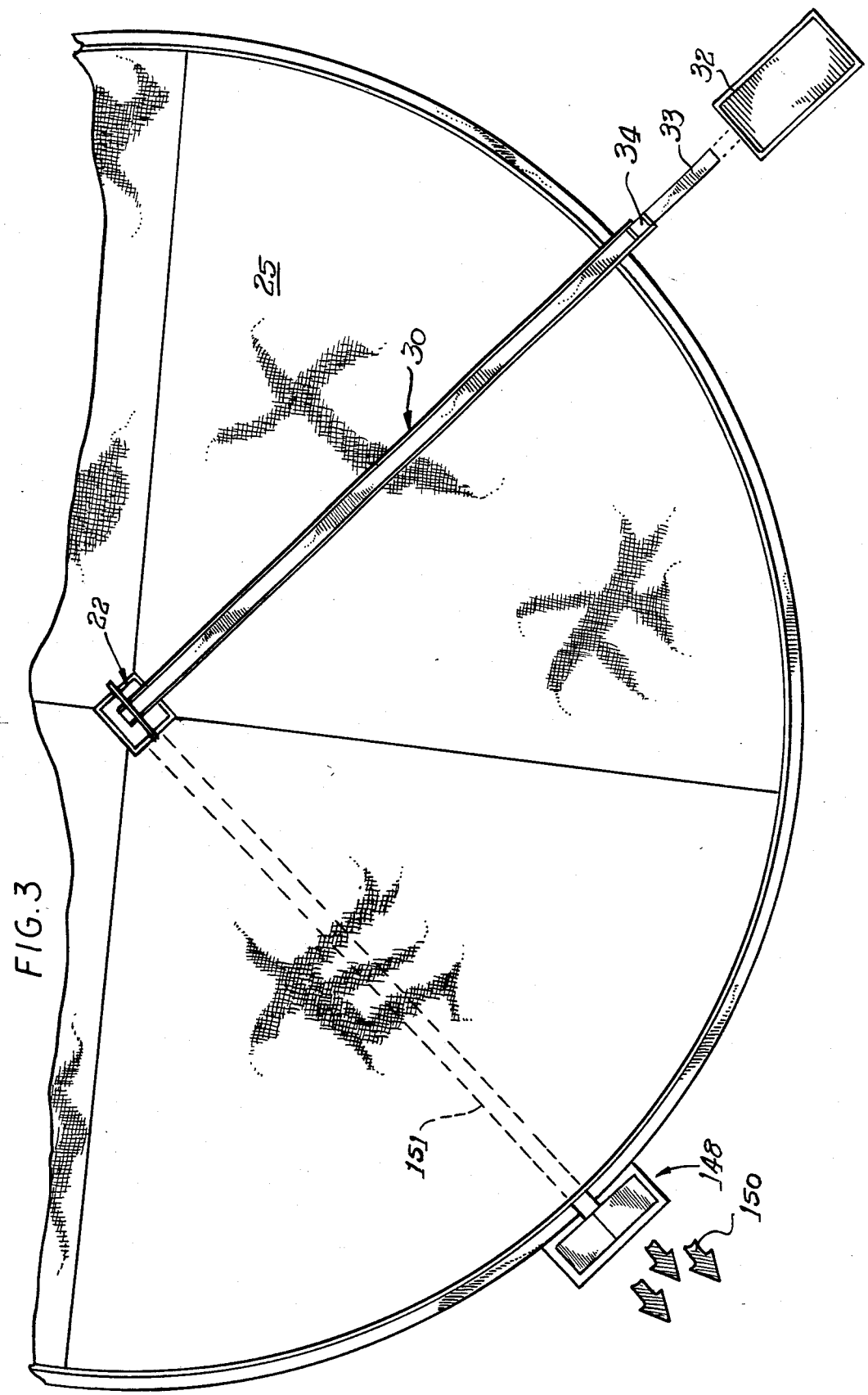
FIG. 3 is a plan view of the grain filling system showing a main air duct and an alternative air duct.

The preferred valve means 52 allows the selectively controlling of the size of the discharge orifice for each of the ports 50 by a manually turnable handle means 57 which is located upwardly adjacent a 56 at which an operator may walk to change and turn one of the handles 57 to swing its attached valve plate 54. Herein, the handles 57 include a vertical shaft 58 which extends through the floor 53 and turns in an aperture 59 in the floor with the lower end 60 of the shaft 58 also being pivotably mounted in an aperture 61 in the bottom wall 56 of the grain receiving chamber 48. The plate 52 is fixed at 63 to the shaft 58 so that when the handle 57 is turned to rotate shaft 58, the plate 54 pivots and slides across the top surface of the bottom wall 56 of the chamber to move between any one of the plurality of positions; such as, fully closing the ports 50 as shown on the left hand side of FIG. 5 or leaving them completely open as shown in the other portions of FIG. 5. However, it is to be realized that the valve plate may be swung to partially cover the ports 50 so as to allow a more limited flow, as desired, to keep the pile more even. Thus, the operator will be observing from time to time the formation of the pile and will decide which of the valves should be fully open to receive more grain to fill any hollows or vacancies on one side, and he will also have a view of the effect of closing or partially closing a port 50 where the grain has build up to be at a significantly higher level than an adjacent or opposite side of the pile. The upper grain receiving chamber has an opening 46 (FIG. 2) in the center of the floor 53 and this floor defines the top of the distribution chamber 48.

Although the valve means 52 and the plurality of ports 50 associated with the various sides of the aeration tower have proved generally satisfactory, there is still need for a further orientation and defining of the movement of these issuing streams of grain flowing from the distributor means 45.

Figure 9:
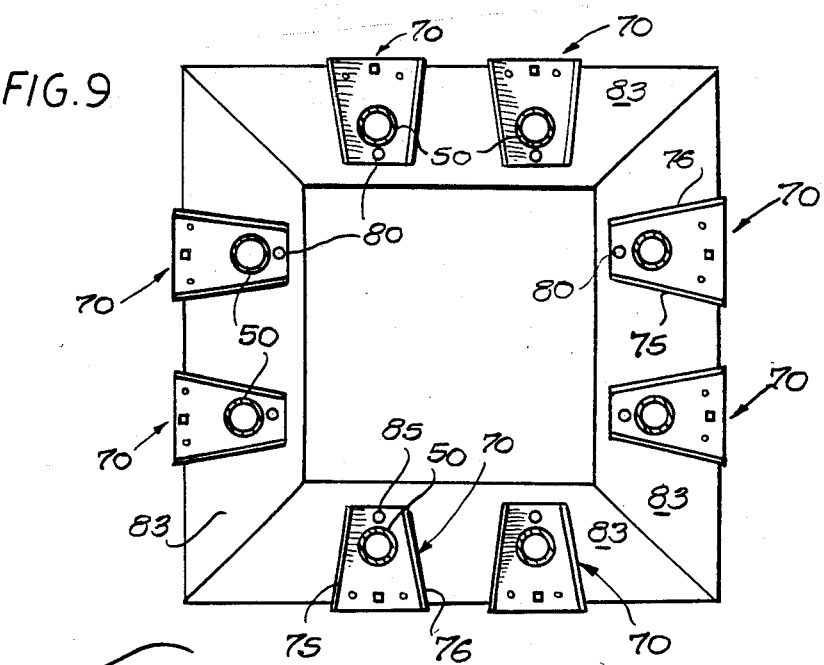
FIG. 9 illustrates the top of the tower showing grain deflector troughs.

In accordance with the present invention, each deflected or diverted to travel in a variety of directions by a deflector means, which is preferably in the form of grain receiving troughs 70. More specifically each of the deflector means is adapted to be pivoted through a plurality of positions, as shown for example at 70a, 70b or 70c in FIG. 11 with the grain going in accordance with the directional arrow 71 when the deflector is in the 70a position. The grain flows in the direction of the arrow 72 when the deflector is in the 70b position; and the grain flows in the direction of the arrow 73 when the deflector 70 is in the 70c position. As can be seen in FIG. 9 there are eight such deflectors each located below a discharge port 50 so that each of the discharged streams be directed may flow through any of the three different directions shown by the arrows 71, 72 and 73. Manifestly, other positions may be provided for the deflector or the deflectors may be provided with infinitely variable positions so that the positions may be changed as desired through an extensive angle of turning a trough.

Figure 10:
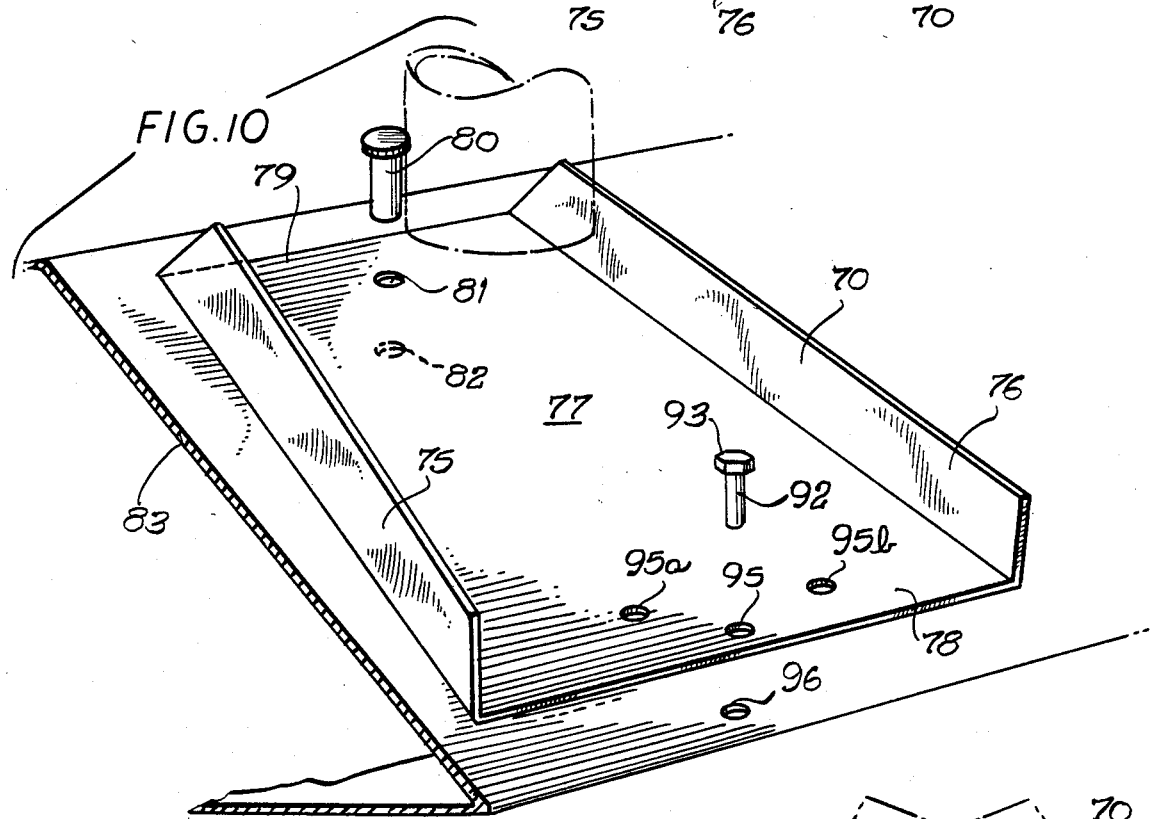
FIG. 10 is an enlarged view showing the construction of the preferred grain trough.
Figure 11:
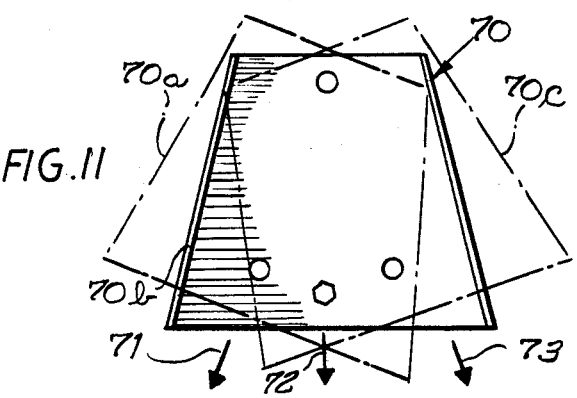
FIG. 11 illustrates the grain trough movable through three different positions for directing the grain at three different angles.

Herein, the preferred and illustrated deflector is formed inexpensively by a sheet metal trough which has upstanding sidewalls 75 and 76 with a central web 77 between the sidewalls. The preferred trough shape has a wider discharge end 78 than an upper end 79, which is narrower, as can be readily seen in FIGS. 9 and 10. The preferred manner of mounting the deflector 70 is by means of a pivot pin 80, which is inserted through an aperture 81 in the bottom web 77 and through an underlying opening 82 in an inclined upper wall 83 of the tower 22. The troughs rest on the inclined walls 83 and are inclined downwardly at the same angle. As seen in FIG. 4, the inclined walls 83 are at the top of a aerating tower and are inclined and extend from locations beneath the bottom wall 56 of the upper chamber 48 to horizontal supporting braces 90 at the top of the tower. The preferred means to stop or otherwise detent the deflector means 70 in each of its different directional positions 70a, 70b or 70c as shown in FIG. 11 is by means of a stop or detent preferably in the form of a bolt 92, which has a head 93 larger than a hole 95 in the incline wall 83. This wall 83 has a single hole 96, which is aligned below the hole 95. The holes 95a and 95b are on an arc to be swung over the hole 96. Merely, by swinging the trough about the pivot pin 80, any one of the three holes, 95, 95a, or 95b may be aligned over the opening 96 and then the bolt 92 may be inserted to lock the trough into position until it is again desired to change its location. Manifestly, many other devices may be used to hold or otherwise secure the trough in any one of the given plurality of positions, the number and the extent of which may be varied in accordance with this invention.

The filling process may take several days and that during the filling operation there could be rain or there can be high winds which could interfere with the granular material being dropped and which would allow a large among of rain water to move down along the central tower and into the central opening of the cover 25 and into the grain being amassed in the pile. To prevent the direct flow of water down the tower and into the grain pile, and also to make the tower more effective as a aeration device, there is provided a fill skirt 100; which is a long plastic cover or sheet which is made to surround the walls 102 (FIG. 4) of the tower 22 on all four sides so as to cover the open spaces 103 between various adjacent metal horizontal slats or bars 104 which are connected to the vertical beams 105. Other structural horizontal beams 106 and diagonal beams 107 are used to construct a very rigid tower which serves as a aeration device allowing the inflow of air as shown by the directional arrows in FIG. 4, into the hollow center of the tower. The fill skirt 100 prevents the inflow of air into the tower until it has been raised to uncover the spaces 103. The fill skirt 100 is secured at the top edges 108 (FIG. 4) to a vertical side wall 109 of the distributor chamber 48 and extend downwardly outside of the discharge mouths of the troughs 70 so that the grain flowing from the ports 50 will flow down the troughs 70 and against the fill skirts 100 pushing the same away from the wall of the tower thereby creating a space for allowing the grain to drop vertically downwardly in the space formed between the tower wall and the fill skirt 100 to the bottom of the pile where it then falls along its natural line of repose which will be preferably at about 22°. The grain is falling in FIG. 2 inside the fill skirt 100 and downwardly to a lower end 110 of the fill skirt which is threaded or shingled over the cover 25 so that the grain falls underneath the upper central portion 24 of the cover and into the underlying pile beneath the cover.

Figure 12:
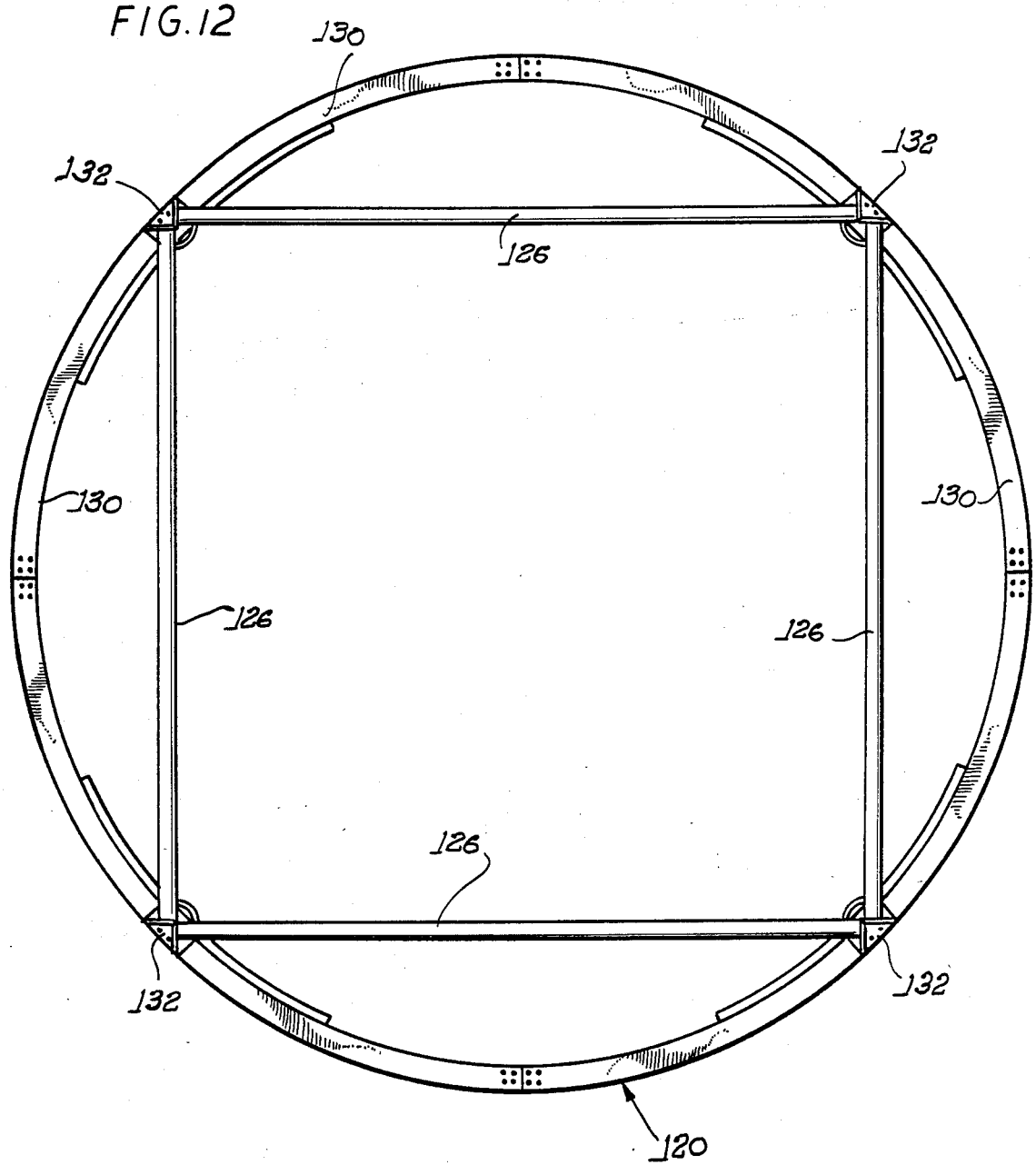
FIG. 12 is a plan view of a lifting ring having threading tubes for the fill skirt thereon.
Figure 13:
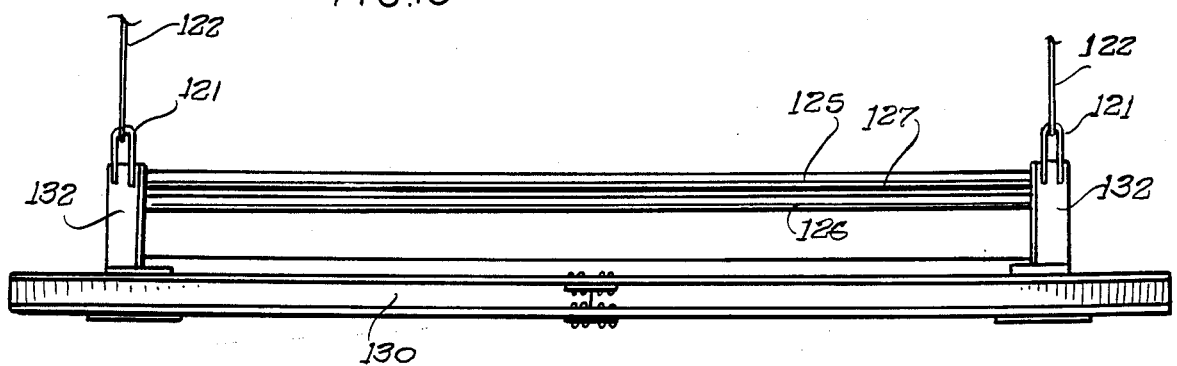
FIG. 13 is a side elevational view of the ring and tubes of FIG. 14.

The preferred and illustrated means for providing the interfacing of the lower end of the fill skirt and the top end of the cover as shown in connection with FIGS. 12 and 13, a lifting means. The preferred lifting means is in the form of a lifting ring 120 which has a series of upstanding hooks 121 to which are attached the lower end of vertical cables 122 which extend from the lifting rig 120 all the way up to pulleys 124 (FIG. 4). The cables extend along the filling conveyor to a convenient place at the ground where they may be winched to lower and raise the lifting ring in the manner hereinafter described. The lifting ring will be raised from an initial lower position shown in FIG. 7 to the very top position such as shown in FIGS. 1 and 8 when the pile has been complete.

The lifting ring 120 has two round threading tubes 125 and 126 at each of its four sides. The tubes are spaced vertically to define a threading slot 127 therebetween to which is threaded one side of the fill skirt 100 so that the fill skirt may be pulled and threaded without tearing. The fill skirt 100 has four threaded without tearing vertical sides spliced together at the corner of the tower. The splices may be undone and the lowest end of each side is threaded through a thread slot 127. Thus, each lower end of each side of the fill skirt extends outwardly from a pair of threading tubes 125 and 126 and then is wound around a plank 128, usually of wood. The plank and rolled skirt thereon provide a weight which tensions and pulls the fill skirt to keep it taught. The plank and rolled fill skirts are laid on the top of the cover and the curved portion of the fill skirt from the threading tubes to the plank acts as a deflector or a shingle to deflect off the water which may flow down the sides of the fill skirt during a rain storm so that the water is diverted downwardly and across the top of the cover 25 rather than being allowed to flow directly into the mass of grain being accumulated in the pile. It will be appreciated, as best seen in the FIG. 12, that there are a set of threading tubes 125 and 126 on all of the four sides of the lifting ring.

Figure 14:
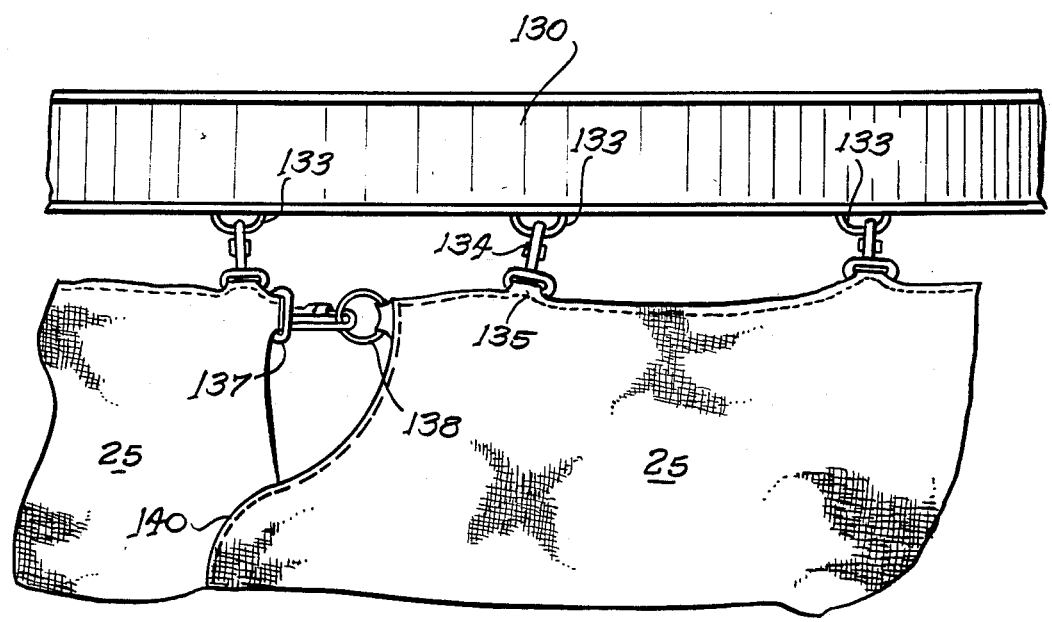
FIG. 14 is view showing the connection of the top of the conical cover to the lifting ring and showing the fill skirt threaded to the tubes on the lifting ring.

For supporting and lifting the top portion of the cover 25, the lifting ring is provided with a outer circular ring 130 which encircles the tubes 125 and 126 which are fastened and opposite ends to upstanding posts 132 which are disposed above the plane of the circular ring 130. The ring 130 is an I beam in shape to provide a strong rigid structure. On the lower side of the ring 130 are a series of welded loops 133 to which are attached to snap-hooks 134 which are fastened at their other ends 135 at a series of space intervals to the top upper edge of the cover 25. This forms a detachable connection between the cover and the bottom of the ring 130. Also, as shown in FIG. 14, there is another snap ring 137 which is attached to a hook 138 in the axial direction at the location of a seam 140 which is a thread seam which can be opened to allow access for a worker to move onto the top of the pile to shovel grain when necessary or to do whatever is necessary inside and beneath and between the cover and the aeration tower. Thus, it will be seen that the preferred and illustrated lifting ring serves not only to lift the top portion of the cover up the sides of the aeration tower much in the manner in which a circus tent would have its center portion lifted along a central pole but also to provide an interface between the fill skirt 100 and the cover 25. The fill skirt is a thin flexible vinyl sheet or canvas sheet of air impervious material so as to maintain a relatively tight air barrier on the tower and too keep the rain out and to keep the grain in as the grain flows downwardly along the aeration tower and across the interface between the fill skirt 100 and the cover sheet 25.

In accordance with another important aspect of the invention, the grain in the pile is being aerated during the filling operation, and at the same time the filling skirt 100 and the cover 25 are being held taught against the sides of the tower. That is, an air pressure differential exists between the outer sides of the cover and fill skirt and the undersides thereof to resist the lifting and flapping of the fill skirt 100 or the cover 25 during windstorms which often may occur during a filling operation. This pressure differential is obtained and maintained by aerating the grain during the filling operation as now will be described. The aeration patterns can best be understood with reference to FIG. 1 in which there is shown a air exhaust assembly 148 including a large fan or centrifugal blower which pulls the air for discharging outwardly, as shown by the air exhaust arrows 150 in FIG. 1, with the air having been pulled through a central duct 151 which is located at the base of the aeration tower 22. The air flows inwardly through the retaining wall slots 20 of the retaining wall 17 and through the grain mass into the perforated walls of the tower so as to then flow downwardly to the base of the tower into the central duct 151. The same flow is started when the pile is very small and the fill skirt 100 is covering the aeration tower above the cover. If the sides of the aeration tower above the cover were not covered, the air would flow along the easiest path of resistance through the uncovered tower perforations rather than flowing through a greater path of resistance through the grain pile. Thus, it will be seen that there is provided a unique system which is very effective in holding the cover and filling skirt tight against lifting and that the aeration of the grain can begin immediately and can be continued through the filling process, which may take a considerable period of time depending upon the availability of the crops and the weather at the time of filling.

In accordance, another important aspect of the invention it is preferred that the grain be allowed to be readily sampled at the central lower portion of the pile of grain. This is accomplished by having grain sampling means at the bottom of the aeration tower which allow the grain removal as shown in FIG. 16. More specifically, it is preferred to provide the bottom of the tower with a grain sampling means defined by a series of horizontal bars or angle 170, as best seen in FIGS. 15 and 16, which provide spaced chambers 171 which may partially fill with a sample 172 of the granular material. It has been found that the spacing of the depending flange 175 from horizontal angle iron 169 to define an opening 178, allows grain to flow into the space 171 but not out across an upstanding outer flanger wall 179 of an angle iron 170. The grain will not flow over the top edge 180 of the vertical wall 179 but rests at an angle of repose 182 which is inclined downwardly and inwardly as shown in FIG. 16. The preferred construction then has angle irons 169 which have the depending flanges 175 and have large horizontal upper flanges 184 which are attached horizontal leg 187 of the smaller angle irons 170. It is this construction that imparts strength to the lower portion of the tower and yet provide an inexpensive grain sampling means whereby a sample of the grain may be taken as diagrammatically shown in FIG. 16. The respective angle irons 169 and 170 are attached to the rigid vertical columns which define the side of the tower.

The preferred manner of accessing the grain in the chambers 171 is by a person moving through the hollow main air duct into a space 190 which is preferably concrete lined pit 191 at the base of the tower at which a person may stand. The lower portion of the tower is suitably connected by bolts 192 to the concrete base 15 as shown in FIG. 15. The person having moved through the air duct may then stand within the space 190 at the bottom of the hollow tower 22 and his head will be located in a position to see the grain in the chambers 171 and he can then remove some of the grain for carrying back through the air duct for subsequent analysis to see if it is has deteriorated and/or what condition it is in.

In the foregoing, it will be seen that there has been provided a new and improved grain storage system which provides unique aeration, particularly during the filling and which allows sampling of the grain within the interior of the stack.

The grain flow to form the stack is facilitated into a neat even conical pile by a unique distributor that ensures even filling and less problems in topping off the stack than with prior art methods. The filling is also enhanced by the use of a filling skirt which keeps out the water and which is threadedly joined to the top of the cover by means such as a lifting ring so that the water or other material is kept out during the filling operation. A vacuum is maintained such that the aeration flows through the material in the pile rather than through an upper open end of a conveyor of an aeration tower. The pressure differential caused by the blower pulling air through the impervious air duct from the central aeration tower holds the cover down against the top of the grain pile and the filling skirt tight against the aeration tower walls except when displaced therefrom by falling grain. Upon the completion of the pile, the top cover may be tied off to the fill skirt and tightly connected to the aeration tower so that air or rain will not flow into the top of the grain pile. The lower peripheral edge of the cover 25 is then tightly secured to the retaining wall 17 so that there is a virtual air seal therebetween, eliminating any water or air flowing between the cover and the retaining wall. Thus, air must flow through the height of the retaining wall 17 so that there is a large air flow incoming circumferentially about the entire lower peripheral portion of the conical grain pile and flowing radially inwardly and upwardly to the central aeration tower at which the air is then drawn through its hollow interior to the pit 190 and then downwardly through the main duct for exhaustion from the blower, which is connected to draw air from the radial outer end of the main air duct.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a storage system for flowable granular material delivered by a conveyor to the center of a generally conical pile, the combination comprising:
    a flexible cover for lying on the top of the pile;
    a tower located at a central portion of the cover and of the grain pile;
    a distributor mounted on an upper end of the tower and receiving granular material from the conveyor at the upper end of the tower and for dropping the granular material downwardly along the tower and for distributing the granular material under the cover and for making the pile more even about the tower as the pile grows radially outwardly from the tower;
    an upper receiving chamber in the distributor for receiving a flow of granular material from the conveyor;
    a means for moving the central portion of the cover upwardly along the tower as the conical pile grows in height,
    a plurality of selectively positionable discharge ports around the circumference of the tower for receiving granular material connected to the upper receiving chamber and having openings for discharging variable amounts of granular material in stream having a size dependent on which side of the pile needs more material to keep the pile substantially even about the tower for radial flow outwardly from the tower and beneath the movable cover as the cover raises during filling.

2. A system in accordance with claim 1, wherein the selectively positionable discharge ports include valve means which are selectively positioned to control the size of the opening of the port, and thereby, the amount of flowable granular material flowing therethrough.

3. A system in accordance with claim 2 in which the valve means are selectively adjustable between a fully opened and a fully closed position and positions intermediate the fully opened and fully closed positions.

4. A system in accordance with claim 3 in which the valve means comprise pivotally mounted plates which are selectively pivoted to partially or fully close or leave fully open the openings through which the flowable granular material flows.

5. A system in accordance with claim 4 in which an upright handle is provided within the chamber for actuation by an operator to manually position the valve plates.

6. A system in accordance with claim 1 including selectively positionable deflecting means for deflecting the stream of flowable granular material discharging from a port into one of several different directions to make the pile more even.

7. A system in accordance with claim 6 in which the deflecting means are in the form of movable troughs which are mounted to change an angle of the discharge from the trough to direct the flow from a port into one of several different directions to fill out the granular material into a nice even pile.

8. A system in accordance with claim 7 in which the troughs are pivotally mounted and in which stop means locates the trough in a plurality of different angular positions to direct the flow in each of a plurality of different directions.

9. In the storage system for flowable granular material delivered by a conveyor to the center of a generally conical pile, the combination comprising:
    a flexible cover for lying on top of the pile;
    a central aeration tower located at the center of the grain pile and at a central portion of the cover and having a hollow interior allowing air to flow into the center of the pile;
    a distributor mounted on tower for distributing the granular material under the cover and for making the pile more even about the tower;
    a means for moving the central portion of the cover upwardly along the tower as the conical pile grows in height;
    an upper receiving chamber in the distributor for receiving a flow of granular material from the conveyor and for discharging a plurality of flowing streams of granular material;
    a plurality of selectively positionable deflector means associated with the distributor and located adjacent a lower end of the distributor for deflecting the granular material flowing from the upper receiving chamber in selective ones of different directions for the streams and about the tower and beneath movable central portion of the cover into the pile to make the pile more even beneath the cover.

10. A system in accordance with claim 9; wherein the selectively positionable deflector discharge means comprises troughs from which flow the streams of granular material, the troughs being swung being movable to direct the flow more evenly on to the pile.

11. A system in accordance with claim 10 in which the selectively positionable deflector means comprise pivotably mounted troughs; said troughs being pivoted about an axis to each of a plurality of positions for discharging the stream therefrom in each of several directions.

12. A system in accordance with claim 11 in which a selectively movable stop is provided for securing the pivotably mounted deflector means in a given position.

13. A system in accordance with claim 12 in which the tower has four sides, and in which a deflector means is associated with each of the four sides of the tower.

14. A system in accordance with claim 13 in which a discharge port is located on the distributor above each trough, and each trough is provided with a pair of upstanding side flanges forming a channel with it having a wider discharge end then its inlet end.

15. A system in accordance with claim 14 in which the discharge deflector means are mounted on the tower and in which the discharge ports are mounted on the bottom of the upper receiving chamber, and flow control valve means to control the flow of granular material through the ports and on to the deflectors.

16. In a system for storing grain receiving from a conveyor extending to a central peak location for a conical pile of flow granular material, the combination comprising:
a central vertical aeration tower located at the central peak location of the comical pile and having walls with aeration openings therein to allow air to flow inwardly into the tower for vertical flow within the tower;
said aeration tower having a hollow interior to allow air flow at the center of the conical pile of granular material;
a flexible cover for disposition on the top of the conical pile to cover the same;
a lifting means movable vertically from a lower position nearer the bottom of the pile to an upper position and for lifting a central section of the cover upwardly along the tower as the granular pile beneath the cover is growing in vertical height, and
a filling skirt spaced from the tower and extending vertically from the top of the tower down to the cover during filling, the filling skirt allowing the granular material to fall downwardly between the tower and the filling skirt to form a conical pile under the cover.

17. An apparatus in accordance with claim 16 in which the lifting means includes means for holding the lower edge of the filling skirt over the top of the cover to allow granular material to flow beneath the cover and to divert rain water from flowing into the pile.

18. An apparatus in accordance with claim 17 in which the central vertical tower is rectangular in configuration and in which said means includes tubes located on four sides of the rectangular tower, a circular ring on the lifting means, the flexible cover being secured to the circular ring at a lower edge thereof and the filling skirt being threaded about the tubes and disposed over the central portion of the cover.

19. A system in accordance with claim 17 in which the aeration tower has a aeration openings therein for drawing air from the grain in the pile, and in which a filling skirt is positioned against the sides of the aeration tower cover the aeration openings in the portion of the tower above the cover during the filling operation.

20. In a system for storing grain receiving from a conveyor extending to a central peak location for a conical pile of flowable granular material, the combination comprising:
a base;
an air flow conduit associated with the base;
a central aeration tower extending vertically from the base and the center of the pile and being located at the center of the conical pile and having the grain piled there-against said aeration tower having a lower hollow interior;
a flexible cover covering the top of the covered pile and having a portion movable vertical along the aeration tower;
a central means on the tower to lift the central section of the cover;
a retaining wall means associated with the base to retain outer edges of pile, an air conduit extending from the retaining wall means to the central aeration tower, means connected to the conduit to circulate air through the grain pile from the aeration tower, and
grain sampling means at the tower accessible through the conduit to allow removal of the granular material to check the same for spoilage or other conditions.

21. An apparatus in accordance with claim 20 in which the grain sampling storage at the lower portion of the aeration tower comprises a plurality of spaced slates which allow the flow of material into a sampling space.

22. An apparatus in accordance with claim 21 in which the grain sampling slats are provided on four walls of the central aeration tower.

* * * * *